Jan. 22, 1957          R. L. BALKE          2,778,964
SLOT LINER-CLOSER FOR DYNAMOELECTRIC MACHINE CORE MEMBER
Filed Dec. 29, 1954
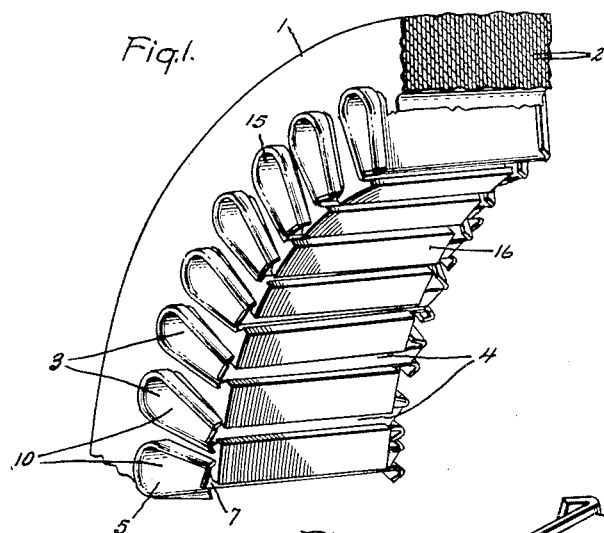
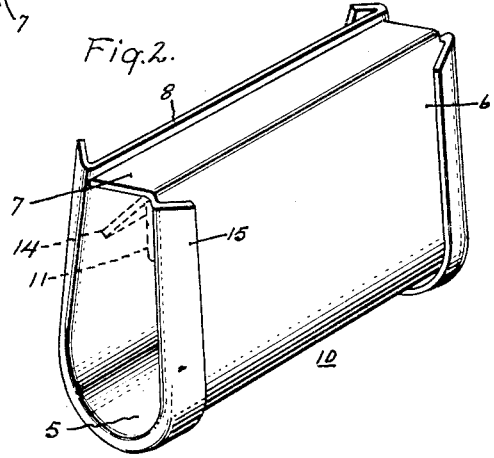
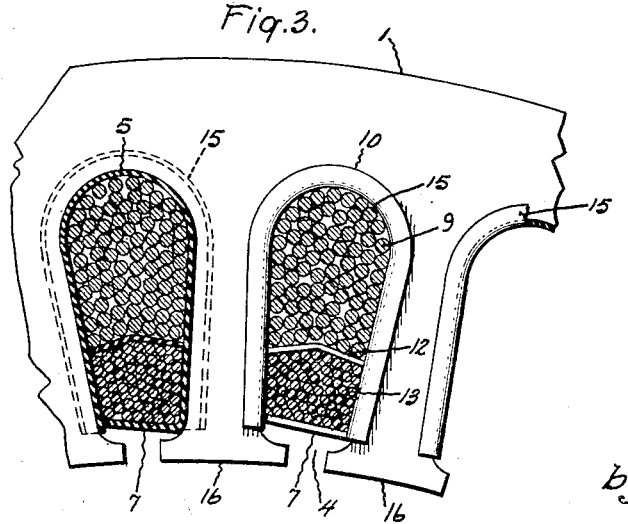
Inventor:
Roy L. Balke,
by *His Attorney.*

United States Patent Office 2,778,964
Patented Jan. 22, 1957

2,778,964

SLOT LINER-CLOSER FOR DYNAMOELECTRIC MACHINE CORE MEMBER

Roy L. Balke, Fort Wayne, Ind., assignor to General Electric Company, a corporation of New York Application December 29, 1954, Serial No. 478,345

4 Claims. (Cl. 310—214)

This invention relates to dynamoelectric machines, and more particularly to an improved liner for the slots of the core members of such machine.

An essential part of a dynamoelectric machine is a core of magnetic material. Such cores are often provided with a plurality of slots to receive the coils of current-carrying magnet wire which will generate the flux required in the core. It is, of course, imperative that the coils be insulated from the core, and that they be wedged therein so that it will not be possible for any of the magnet wire to escape out of the slot opening. Even where the core member is subjected to a special resin treatment after the coil has been inserted, it is nonetheless necessary to maintain the coil properly within the slot until the time of the treatment. Thus, in the past, some type of wedging means has always been necessary to maintain the coils of magnet wire properly within each slot. It has further been necessary, even where the wedge was formed as an integral part of the slot liner, to perform an entirely separate wedging operation after the coil was properly placed in the slot. It is most desirable to eliminate the necessity for such a separate operation with its consequent consumption of time and labor, and to provide a relatively simple and economical structure which will perform the desired functions without requiring the extra operation after the insertion of coils into a slot.

An object of this invention is, therefore, to provide a slot liner which is so formed as to provide the desired wedging action without requiring an extra operation.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention, in its broadest aspect, provides a slot liner member for use in the slots of a dynamoelectric machine core member. This liner member is made of a resilient insulating material such as, for instance, polyethylene terephthalate, and includes a first portion, which is adapted to line the interior of a slot, and a second flat portion which is bendably secured to one end of the first portion. The flat portion is of sufficient length to bridge across to the other side of the first portion and is adapted first to bend inwardly to permit the insertion of coils in the slot and subsequently to spring back again to bridge across the lining portion. By this means, a slot liner is provided which includes means whereby once the coils have been inserted in the slot they are automatically wedged in by a structure which is integral with the slot liner member.

In the drawing,

Figure 1 is a fragmentary view in perspective, partly in cross section, of a dynamoelectric machine core member having slots provided with the improved slot liner of this invention;

Figure 2 is a view in perspective of the improved slot liner of this invention; and Figure 3 is a fragmentary end view, partly in cross section, of a dynamoelectric core member having slots provided with the improved slot liner of this invention once the coils have been inserted into the slot.

Referring now to the figures of the drawing, there is shown a fragment 1 of the stator of a dynamoelectric machine (not otherwise shown) which is generally formed of a plurality of thin laminations 2 of magnetic material. The stator 1 is formed with a plurality of slots 3 each having an opening 4 to the bore 16 of the stator 1. Within each slot 3 is placed a slot liner member 10 which forms the essence of the present invention, and which includes a lining portion 5 which extends around the interior of the slot, as shown. Slots 3 are substantially U-shaped, and the lining portion 5 will therefore be provided with a similar U-shape. Side 6 of the U-shaped portion 5 terminates in a flap portion 7 which is at least sufficiently long to bridge across from side 6 of the portion 5 to side 8 thereof. As best shown in Figure 3, the flap 7 is preferably sufficiently long so that it will bridge across from one side of the U-shaped portion 5 to the other even though it be at a small angle, such as about 20 degrees, to the shortest distance between the two sides (in this case, a line between the ends of portion 5).

In Figure 3 there are shown main windings 9 arranged within each of the slots. It will be seen by reference to Figure 2 that flap portion 7 may be bent down to a position such as that shown in dotted outline at 11 so as to permit the main coil 9 to be introduced either by machine or by hand. Separated from main winding 9 by a phase insulation part 12 is a start winding 13 which may be introduced into the slot either by machine or manually.

Normally, where windings are introduced into each slot by machine, it will be necessary to move flap portion 7 to the position shown by the numeral 11 and this will be a limiting factor on the amount of starting winding which may be introduced into each slot. However, where, as is common, the slot winding is introduced into each slot by manual means, the flap portions 7 may be bent down only to the position shown in dotted outline by the numeral 14, and the start winding coils may be introduced into the slot around the flap portion 7 while it is in this position. This will permit the introduction of a greater number of coils than is possible by machine methods. In either event, however, the slot 3 is normally rather narrow just within the opening 4. Therefore, flap portion 7 may be relatively short, and even when it is bent down to the position shown by the numeral 11 it will not decrease to a marked degree, the number of coils which may be inserted into a slot.

It is necessary to use a material for slot liner member 10 whose resilient properties are such that the flat portion 7 will always tend to resume its position bridging parts 6 and 8 of the U-shaped portion 5. One material, for instance, which has been found excellent for this purpose is polyethylene terephthalate.

In view of the structure set forth and the nature of the material, at the end of the operation of inserting the coils into the slots flap portion 7 will return to the position bridging the two parts 6 and 8 of portion 5 and thus will wedge the coils into the slots in such a manner that none of them can escape through opening 4. It will be observed that this may be achieved in the desired manner while nonetheless completely eliminating any extra operation of inserting or arranging wedging means after insertion of the coils in the slots.

It will be seen from the figures that slot liner member 10 may be provided with bent back cuff portions 15. These cuff portions perform the dual function of locating the slot liner within the slot so as to prevent undesirable relative axial movement between the two, and of providing insulation between the edge of the slot and the end turns of the coils within the slot. However, it will be understood that this feature is optional, and that the arrangement whereby the wedging operation is eliminated may be provided without cuffs such as 15.

It will of course be understood that the provision of main and starting winding coils in the slots 3 is for illustrative purposes only, and that the improved slot liner of this invention may be advantageously used whatever the arrangement of the magnet wire within the slot insofar as phase is concerned.

While this invention has been explained by describing a particular embodiment thereof, it will be apparent that improvements and modifications may be made without departing from the scope of the invention as defined in the appended claims.

What I claim as new and desire to secure by Letters Patent of the United States is:

1. For use in the slots of a dynamoelectric machine core member, a slot liner member of resilient insulating material comprising a portion adapted to line the interior of a slot, and a flap portion bendably secured to one end of said lining portion and of sufficient length to bridge across to the other end of said lining portion, said flap portion being resiliently biased to bridging position between said ends of said lining portion and being adapted to bend inwardly to permit the insertion of coils in the slot and to spring back thereafter again to bridge across said lining portion thereby to wedge the coils in the slot.

2. For use in the slots of a dynamoelectric machine core member, a slot liner member of resilient insulating material comprising a substantially U-shaped portion adapted to line the interior of a slot, and a flap portion bendably secured to one end of said U-shaped portion and of sufficient length to bridge across to the other end of said U-shaped portion, said flap portion being resiliently biased to bridging position between said ends of said U-shaped portion and being adapted to bend inwardly to permit the insertion of coils in the slot and to spring back thereafter again to bridge across said U-shaped portion thereby to wedge the coils in the slot.

3. For use in the slots of a dynamoelectric machine core member, a slot liner member of sheet resilient insulating material comprising a substantially U-shaped portion adapted to line the interior of a slot, the legs of said U-shaped portion being inclined toward each other so that the ends thereof are relatively close together, and a flap portion bendably secured to one end of said U-shaped portion and of sufficient length to bridge across to the other end of said U-shaped portion, said flap portion being resiliently biased to bridging position between said ends of said U-shaped portion and being adapted to bend inwardly to permit the insertion of coils in the slot and to spring back thereafter again to bridge across said U-shaped portion thereby to wedge the coils in the slot.

4. For use in the slots of a dynamoelectric machine core member, a slot liner member formed from a sheet of polyethylene terephthalate comprising a substantially U-shaped portion adapted to line the interior of a slot, the legs of said U-shaped portion being inclined toward each other so that the ends thereof are relatively close together, and a flap portion bendably secured to one leg of said U-shaped portion and of a length sufficient to bridge across to the other leg of said U-shaped portion when said flap portion is at an angle of approximately 20 degrees to a plane formed by the ends of said U-shaped portion, said flap portion being resiliently biased to bridging position between said ends of said U-shaped portion and being adapted to bend inwardly to permit the insertion of coils in the slot and to spring back thereafter again to bridge across said U-shaped portion thereby to wedge the coils in the slot.

References Cited in the file of this patent

UNITED STATES PATENTS

| | | |
|---|---|---|
| 2,417,746 | Fletcher | Mar. 18, 1947 |
| 2,495,010 | Kirkpatrick | Jan. 17, 1950 |
| 2,701,316 | Willits et al. | Feb. 1, 1955 |